United States Patent

(12) United States Patent
Dennert et al.

(10) Patent No.: US 8,260,277 B2
(45) Date of Patent: Sep. 4, 2012

(54) CONTROL OF CALL DELIVERY AND CALL FORWARDING OF TELECOMMUNICATION CONNECTIONS, ESPECIALLY IN MULTI-DEVICE CONFIGURATIONS

(75) Inventors: Thomas Dennert, Troisdorf (DE); Joachim Quast, Bad Honnef (DE); Michael Spörl, Bonn (DE); Gerrit Vöhringer, Bonn (DE); Georg Wegmann, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 13/205,875

(22) Filed: Aug. 9, 2011

(65) Prior Publication Data

US 2011/0294482 A1    Dec. 1, 2011

Related U.S. Application Data

(62) Division of application No. 10/595,332, filed as application No. PCT/EP2004/011238 on Oct. 8, 2004, now Pat. No. 8,019,327.

(30) Foreign Application Priority Data

Oct. 9, 2003 (DE) .................................. 103 47 617

(51) Int. Cl.
*H04M 3/42* (2006.01)
(52) U.S. Cl. .......................... 455/417; 455/445; 455/509
(58) Field of Classification Search .................. 455/417, 455/445, 509, 419, 420
See application file for complete search history.

(56) References Cited

U.S. PATENT DOCUMENTS

| | | | |
|---|---|---|---|
| 5,454,032 A | 9/1995 | Pinard et al. | |
| 5,708,809 A | 1/1998 | Leimkoetter | |
| 5,711,006 A | 1/1998 | Brochu et al. | |
| 5,812,639 A | 9/1998 | Bartholomew et al. | |
| 6,141,556 A | 10/2000 | Dougherty et al. | |
| 6,219,551 B1 | 4/2001 | Hentila et al. | |
| 6,366,777 B1 | 4/2002 | Uusitalo | |
| 6,587,683 B1 | 7/2003 | Chow et al. | |

(Continued)

FOREIGN PATENT DOCUMENTS

EP    0 711 090    5/1996

(Continued)

*Primary Examiner* — Jinsong Hu
*Assistant Examiner* — Qun Shen
(74) *Attorney, Agent, or Firm* — Faegre Baker Daniels LLP

(57) ABSTRACT

The invention relates to a method and a system for controlling an arrangement of a configuration comprising two or more user devices (multi-device configuration) of telecommunication user devices in a public telecommunication network. According to the invention, the supplementary services of the public telecommunication network associated with the first user device or with an identification chip connected to the first user device are activated in such a manner that changes of the supplementary services are effective in the other user devices or the identification chip connected to the respective additional user device of the multi-device configuration at the same time or with a temporal delay. In this manner, when one or more parallel calls are switched to one or more user devices of the multi-device configuration, before delivery of the call, the kind of the call request resulting in a reservation of resources required for completing the call, the system states of the user devices to be called or of or of the identification chips connected to the user devices and the exchange devices involved therein are determined using an intelligent call control and the call can be delivered in a resource-saving manner.

9 Claims, 2 Drawing Sheets

U.S. PATENT DOCUMENTS

| | | | |
|---|---|---|---|
| 6,738,615 B1 | 5/2004 | Chow et al. | |
| 6,771,761 B1 * | 8/2004 | LaPierre | 379/211.02 |
| 7,043,012 B1 * | 5/2006 | Cannon et al. | 379/377 |
| 7,437,148 B1 | 10/2008 | Vaghi et al. | |
| 2001/0043624 A1 * | 11/2001 | Saito et al. | 370/524 |
| 2002/0001378 A1 * | 1/2002 | Ooi | 379/221.01 |
| 2002/0006193 A1 * | 1/2002 | Rodenbusch et al. | 379/266.01 |
| 2002/0028678 A1 | 3/2002 | Ohmoto | |
| 2004/0005910 A1 * | 1/2004 | Tom | 455/558 |
| 2004/0024855 A1 * | 2/2004 | Tsai et al. | 709/223 |
| 2004/0111599 A1 * | 6/2004 | Jordan et al. | 713/2 |
| 2004/0174975 A1 * | 9/2004 | Sylvain et al. | 379/211.01 |
| 2004/0205244 A1 * | 10/2004 | Marsico et al. | 709/245 |
| 2004/0229601 A1 | 11/2004 | Zabawskyj et al. | |
| 2005/0026600 A1 | 2/2005 | Hymel | |

FOREIGN PATENT DOCUMENTS

| | | |
|---|---|---|
| EP | 0 740 482 | 10/1996 |
| WO | 01/01708 | 1/2001 |

* cited by examiner

CONTROL OF CALL DELIVERY AND CALL FORWARDING OF TELECOMMUNICATION CONNECTIONS, ESPECIALLY IN MULTI-DEVICE CONFIGURATIONS

CROSS-REFERENCE TO RELATED APPLICATION

This application is a division of U.S. application Ser. No. 10/595,332, filed Dec. 15, 2006, entitled CONTROL OF CALL DELIVERY AND CALL FORWARDING OF TELECOMMUNICATION CONNECTIONS, ESPECIALLY IN MULTI-DEVICE CONFIGURATION, which application is related to and claims the benefit under 35 U.S.C. §119 and 35 U.S.C. §365 of International Application No. PCT/EP2004/011238, filed Oct. 8, 2004, the disclosures of which are hereby incorporated by reference.

The invention relates to the control of call forwarding and call delivery in telecommunications networks, especially in cellular phone systems.

BACKGROUND AND PROBLEM DEFINITION

Today's cellular phone networks use various procedures to enable a user to use multiple end devices (the so-called twin-card and multi-card products). This type of product configuration may result, for example, from the parallel use of mobile end devices, a car telephone and an organizer. In this scenario, one or several end devices are activated at the same time for outgoing and incoming calls under a uniform number. In configurations with several simultaneously active end devices, any incoming connection requests occurring under a uniform number are signaled in a parallel manner to the various end devices of the subscriber.

The disadvantage of the existing procedures for such parallel call delivery results from the uncertainty of the status of the end devices (switched off, technically not reachable, busy). This uncertainty may cause:

Unnecessary occupancy of cellular and land-based network resources for attempts to connect that are actually unnecessary Network services such as call forwarding to be executed in the network area of the end device being called, which may lead to partially undesired product scenarios and, in particular, to the unnecessary use of network resources, and to substantial additional costs for net operators and end customers.

Network services, such as call forwarding, depend on data records that are separately assigned to each end device within the network. Since these data records are not automatically synchronized, the result is a different call behaviour depending on which particular end device is being used and/or a substantial cost for the user to manually synchronize the end device data records. Furthermore, the user's selection options for the settings of the network services must be restricted in order to guarantee the correct network behaviour during the delivery of parallel calls.

EP 0 711 090 A2 discloses a method to control a configuration of telecommunication end devices comprising an arrangement of two or more end devices (multiple-device configuration) in a public telecommunication network. A number of subscriber identification chips share one single subscriber identification number.

U.S. Pat. No. 5,708,809 A describes a method to update the program structure of a modular communication facility, which consists of several modules connected to each other through a bus. Upon the commencement of operation or a change in the configuration, the program structure is automatically updated separately in each module.

EP 0 740 482 A1 relates to a telephone management system in the form of a separate processor set up with the subscriber, which enables the connection of a number of subscriber's end devices, such as cellular phone, cordless telephone, answering machine, etc. When an incoming call arrives, the processor forwards it to the momentarily "active" and device.

WO 01 0708 A1 discloses an automatic call distribution system similar to the one of EP 0 740 482 A1 with the difference that, here, the distribution of calls to connected end devices is performed by a network element of the communication network.

Therefore, the technical task of the present invention is to propose a method and a system configuration that will guarantee a network resource-saving control of end devices arrayed in a multiple-device configuration and, at the same time, to provide the user with a central control for all system behaviour.

This technical task is resolved by using a special control circuit and the associated process according to the characteristics of the invention claims, the disclosure of which we herewith make reference.

ADVANTAGES OF THE METHOD

Optimal use of network resources for the design of telecommunication connections, especially in cases that involve call forwarding and parallel call attempts to several end devices assigned to a single number.

Simple synchronization of a subscriber's features with respect to a public cellular phone network, which the subscriber would want to set up and call up as a one-time procedure in the several end devices assigned to him.

SCOPE OF APPLICATION

The basic idea of the invention relates to telecommunications networks in general. From the current point of view, a possible application to public cellular communication networks (for example, according to the GSM standard) is interesting; however, the application is not limited to this area.

In this document, when we speak of end devices in connection with cellular (mobile) telecommunications, in addition to the end device itself, we understand also a combination of an end device and a connected identification chip (for example, GSM SIM, UMTS USIM, etc.) in all of the various versions that one might find in both existing and future cellular phone networks.

TECHNICAL BASIS OF THE METHOD

The method uses the technology and network protocols according to international telecommunications standards, especially GSM/UMTS, and—in this case—particularly those that accord with GSM CAMEL and MAP standards. The functioning logic of the method is based on a central service node and a service database that communicates with and controls the switching and the mobility/profile databases of the subscribers to the cellular telecommunications network.

A typical implementation of such a base is represented by the Intelligent Network Technology according to CCITT Q12XX Series (See also ETSI CORE INAP protocol according to ETS 300 374, ETSI GSM CAMEL protocol 03.78) in conjunction with GSM MSC and GSM HLR.

DESCRIPTION OF THE METHOD

In the subsequent text, we describe the invention-underlying idea using an example design without, however, limiting the idea's universal applicability.

Figure 1:
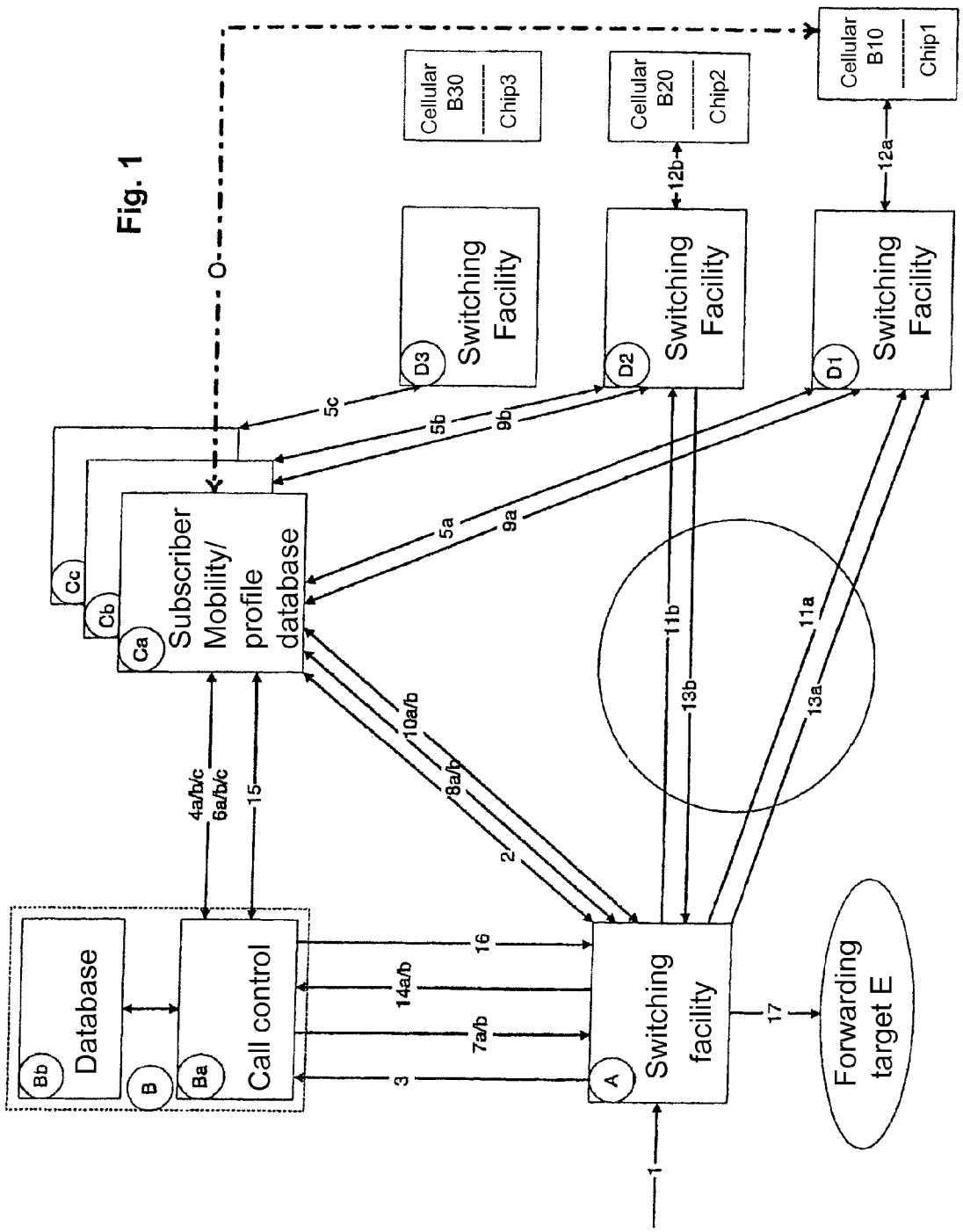
FIG. 1 shows a schematic representation of the network elements and devices involved in the invented method.

Description of the Network Elements Used in FIG. 1:
The individual blocks represent the following devices:
A): Switching facility of a public network (for example, GSM MSC: mobile switching center)
Ba/b): Intelligent call control in a public network with an integrated or remote database for controlling the logic and subscriber data (for example, IN SCP/SMP, service control point/service management point)
Ca/b/c): Mobility/profile databases of the public network with location information and feature profiles of the cellular phone subscriber (for example, GSM HLR, home location register)
D1/D2/D3): Switching facility of the public network (for example, GSM MSC)
B10/B20/B30): Mobile end devices
E): Forwarding target Several mobile end devices B10, B20, B30 (main and subsidiary devices) of a subscriber are assigned a single common subscriber's number in the database Bb of a central call control system. Each end device is operated, in a well-known manner, with an identification chip, which is also called or referred to as a subscriber identification module, SIM card, GSM SIM, UMTS, or USIM. The identification chip stores, among other things, subscriber data that are required to access the cellular phone network and to use its services.

First, the subscriber sets up the features (such as call forwarding) for the main device B10. The corresponding settings for the subsidiary devices B20 and B30 are not set and the subscriber cannot change them. As will follow from the subsequent explanation, as a matter of fact, no corresponding settings are required for the subsidiary devices.

If the switching facility A receives a call for the subscriber under the subscriber's number common to all his end devices, such a call shall initiate a polling of the subscriber's database Ca, which then—based on the subscriber data, which is set up accordingly—initiates the polling of the central call control system B.

This central call control system contains, in an assigned database, information related to devices B10, B20, B30, which are assigned to the particular subscriber's number. The call control system B then determines the status of the assigned end devices in the mobility/profile databases Ca, Cb and Cc of the subscribers to be called. At the same time, the status of the subscribers to be called is also being polled in the location switching centers D1, D2, D3. Based on this information, and using a corresponding control circuit in the call control system B, it is determined whether it makes sense to call the end devices in the network, or to immediately forward or release the incoming call. If—according to the rules stored in the call control system—the end devices are to be called, the call control system B requests that call switching facility A continue the call setup, while parallel call attempts to multiple end devices B10, B20 and B30 can be performed. At the same time, the call control system instructs the switching facility A to report the unsuccessful end of these call setup attempts to call control system Ba. Normally, upon reaching certain conditions (not available, no calls accepted within the call interval), incoming calls are forwarded in the location switching facilities D1, D2, D3 of the subscriber on the basis of the profile of the called subscriber stored in the mobility/profile database Ca, Cb, Cc. In order to avoid this undesired effect, the call control system instructs the location switching facility D1, D2, D3 of the subscriber, by means of a suitable signal, to suppress call forwarding. If in the further course of action no connection is established, because, for example, the end devices being called are not reachable or the subscriber does not accept the call, a negative acknowledgement shall be sent back to the call control system B. Based on this information and on the polling of the subscriber's profile in the main end device B10, which is used for all end devices, the call control Ba determines the reaction desired for the further course of action. This can be the release of the connection or the forwarding of the call to a new target E. At this point, the call control causes the call switching facility to trigger the corresponding functions and ends the control.

The subsequent example illustrates this process while describing the individual process steps 0 to 17 as represented in FIG. 1.

0) Setup of the subscriber's profile (especially of the desired call forwarding behaviour) by the subscriber on end device B10 in the assigned profile database Ca at any time before the subsequently described process;

1) An incoming call to the uniform number of the particular subscriber arrives at the switching facility A;

2) Determination of the subscriber's location, for example, within the range of the switching facility D1, and of the subscriber's profile in the mobility/profile database Ca by the switching facility A;

3) Polling of the call control Ba by the switching facility A, triggered by the polled subscriber's profile;

4a/b/c) Polling of the status of the end devices being called in the mobility/profile databases Ca, Cb, Cc by the call control B;

5a/b/c) Polling/communication of the status of the end devices being called B10, B20, B30 in the switching facilities D1, D2, D3 in whose range the end devices are located;

6a/b/c) Communication of the status of the end devices being called B10, B20, B30 to the call control Ba.

Afterwards, further steps are determined according to the call control algorithm stored in the call control system B (See Table 1). In the present example, the end device B30 has been reported by the location switching facility D3 as being unreachable. Thus, a call attempt with the corresponding use of the communication resources could be eliminated. The end devices B10, B20 have been reported to be free.

7a/b Initiation of call attempts to the "free" end devices B10/B20 of the same subscriber;

8a/b) Polling of the information necessary for call setup in the subscriber's mobility/profile databases Ca, Cb;

9a/b) Polling/Communication of information required for call setup in the subscriber switching facilities D1, D2 that serve the end devices B10, B20;

10a/b) Communication of the information necessary for call setup between the switching facility A and the mobility/profile databases Ca, Cb;

11a/b) Call delivery with occupancy of the stationary/cellular phone network resources, for example, through a transit network and the cellular phone network;

12a/b) Unsuccessful call setup to the end devices B10/B20 (for example, due to technically unreachable end devices, because the subscriber does not respond, or because the subscriber rejects the call);

13a/b) Communication of a message relating the unsuccessful call setup to switching facility A, release of the network resources;

14a/b) Communication of a message relating to the unsuccessful call setup from the switching facility A to the intelligent call control B;

15) Determination of the settings planned for this case, for example, call forwarding, in the profile database Ca of the main subscriber B10 and deriving of further behavior by the call control system B.

16) Initiation of call forwarding

17) Direct call setup by the network switching facility to the forwarding target E Thus, a connection with the corresponding line occupancy from the original switching facility A to the location switching facility D1, D2 of the subscriber's and further to the final forwarding target E, which is otherwise normal for such call forwarding processes, can be eliminated.

The following Table 1 provides an example of the process by which the suitable behavior of the call control Ba in the network element B is determined (See step 6 above): Using the status determined for the end devices B10/B20/B30 (Here: Table 1, row 3: Idle, Idle, NRc) (Steps 4 through 6), a decision is made on the further course of the connection control.

TABLE 1

| Nb | B10 1) | B20 1) | B30 1) | Response after completion of the status polling | Note |
|---|---|---|---|---|---|
| 1 | Idle | Idle | Idle | Call B10/B20/B30 | 2) |
| 2 | Idle | Idle | Busy | Call forwarding according to subscriber profile | |
| 3 | Idle | Idle | NRc | Call B10/B20 | 2) |
| 4 | Idle | Idle | NP | Call B10/B20/B30 | 2) |
| 5 | Idle | Busy | Idle | See row 2 | |
| 6 | Idle | Busy | Busy | See 2 | |
| 7 | Idle | Busy | NRc | See 2 | |
| 8 | Idle | Busy | NP | See 2 | |
| 9 | Idle | NRc | Idle | Call B10/B30 | 2) |
| 10 | Idle | NRc | Busy | See 2 | |
| 11 | Idle | NRc | NRc | Call B10 | 2) |
| 12 | Idle | NRc | NP | Call B10/B30 | 2) |
| 13 | Idle | NP | Idle | Call B10/B20/B30 | 2) |
| 14 | Idle | NP | Busy | See 2 | |
| 15 | Idle | NP | NRc | Call B10/B20 | 2) |
| 16 | Idle | NP | NP | Call B10/B20/B30 | 2) |
| 17 | Busy | Idle | Idle | See 2 | |
| 18 | Busy | Idle | Busy | See 2 | |
| 19 | Busy | Idle | NRc | See 2 | |
| 20 | Busy | Idle | NP | See 2 | |
| 21 | Busy | Busy | Idle | See 2 | |
| 22 | Busy | Busy | Busy | See 2 | |
| 23 | Busy | Busy | NRc | See 2 | |
| 24 | Busy | Busy | NP | See 2 | |
| 25 | Busy | NRc | Idle | See 2 | |
| 26 | Busy | NRc | Busy | See 2 | |
| 27 | Busy | NRc | NRc | See 2 | |
| 28 | Busy | NRc | NP | See 2 | |
| 29 | Busy | NP | Idle | See 2 | |
| 30 | Busy | NP | Busy | See 2 | |
| 31 | Busy | NP | NRc | See 2 | |
| 32 | Busy | NP | NP | See 2 | |
| 33 | NRc | Idle | Idle | Call B20/B30 | 2) |
| 34 | NRc | Idle | Busy | See 2 | |
| 35 | NRc | Idle | NRc | Call B20 | 2) |
| 36 | NRc | Idle | NP | Call B20, B30 | 2) |
| 37 | NRc | Busy | Idle | See 2 | |
| 38 | NRc | Busy | Busy | See 2 | |
| 39 | NRc | Busy | NRc | See 2 | |
| 40 | NRc | Busy | NP | See 2 | |
| 41 | NRc | NRc | Idle | Call B30 | 2) |
| 42 | NRc | NRc | Busy | See 2 | |
| 43 | NRc | NRc | NRc | See 2 | |
| 44 | NRc | NRc | NP | Call B30 | 2) |
| 45 | NRc | NP | Idle | Call B20/B30 | 2) |
| 46 | NRc | NP | Busy | See 2 | |
| 47 | NRc | NP | NRc | Call B20 | 2) |
| 48 | NRc | NP | NP | Call B20/B30 | 2) |
| 49 | NP | Idle | Idle | Call B10/B20/B30 | 2) |
| 50 | NP | Idle | Busy | See 2 | |
| 51 | NP | Idle | NRc | Call B10/B20 | 2) |
| 52 | NP | Idle | NP | Call B10/B20/B30 | 2) |
| 53 | NP | Busy | Idle | See 2 | |
| 54 | NP | Busy | Busy | See 2 | |
| 55 | NP | Busy | NRc | See 2 | |
| 56 | NP | Busy | NP | See 2 | |
| 57 | NP | NRc | Idle | Call B10/B30 | 2) |
| 58 | NP | NRc | Busy | See 2 | |
| 59 | NP | NRc | NRc | Call B10 | 2) |
| 60 | NP | NRc | NP | Call B10/B30 | 2) |
| 61 | NP | NP | Idle | Call B10/B20/B30 | 2) |
| 62 | NP | NP | Busy | See 2 | |
| 63 | NP | NP | NRc | Call B10/B20 | 2) |
| 64 | NP | NP | NP | Call B10/B20/B30 | 2) |

A Explanations of the notes in the table:
1) Subscriber status:
Busy
NRc = Not reachable
Idle
NP = Not provided
2) Connection setup to the determined end devices is initiated.

Figure 2:
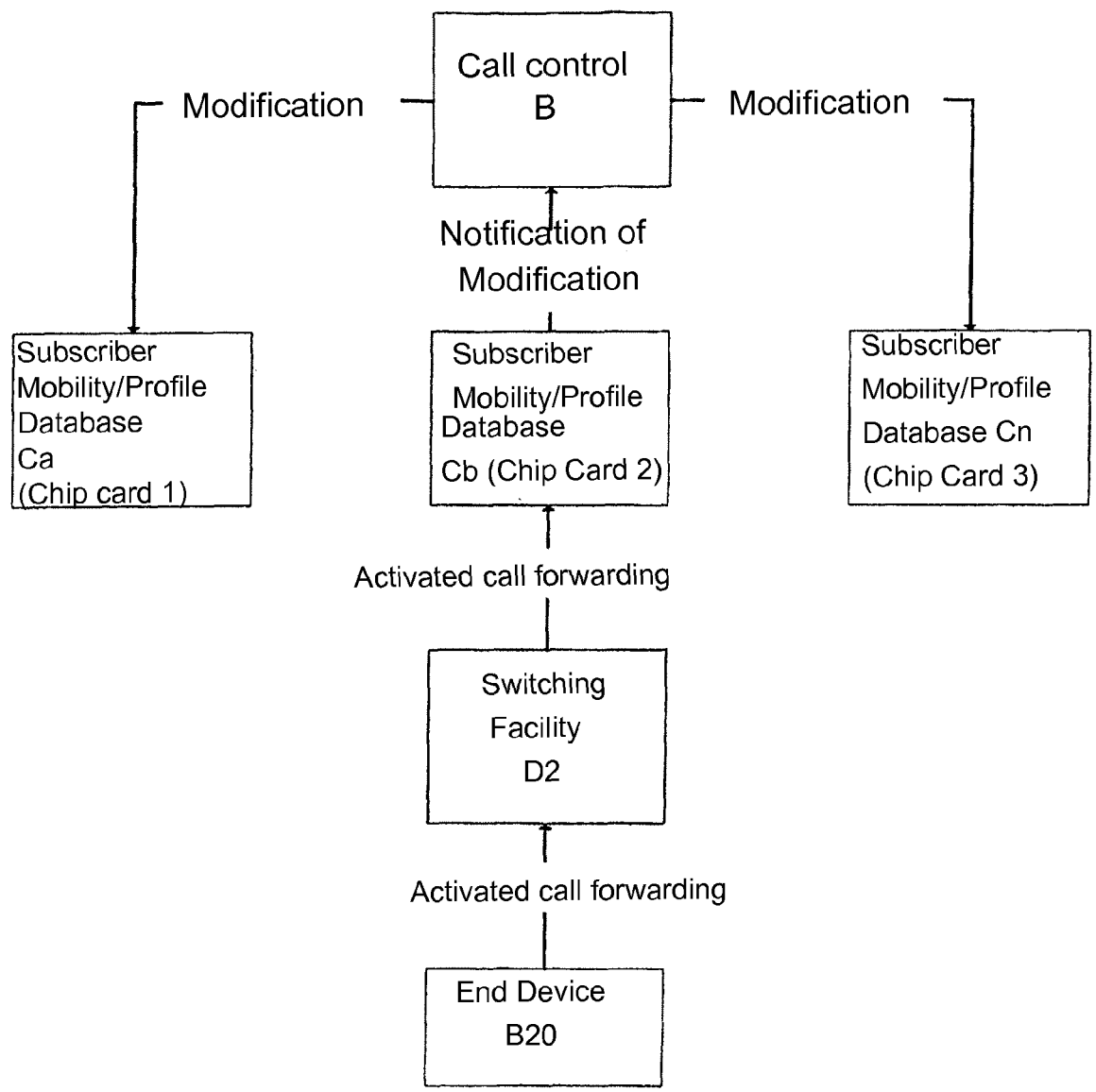
FIG. 2 shows a schematic process flow of the synchronization of the subscriber mobility/profile databases.

A further improvement of the process is achieved, if the call control B not only uses the profile data of the mobility/profile database Ca of a master chip card (which is the SIM card of the main end device) for the control, but this data is also synchronized with the mobility/profile databases Cb, Cc of the other SIM cards. This results in the advantage for the user in that, using any of his end devices B10, B20, B30, he can poll the status of the assigned mobility/profile database Ca, Cb, Cc, and always receives the same information about the status of his features (for example, call forwarding). FIG. 2 shows an exemplary implementation of this synchronization.

The subscriber activates on one of his end devices, for example, on end device B20, call forwarding. The setting performed by the subscriber is communicated by end device B20, or by the SIM card operated with the device through the switching facility D2 and the corresponding subscriber mobility/profile database Cb, and stored there. The subscriber mobility/profile database Cb informs the intelligent call control B about the setting (modification) of the subscriber profile performed by the subscriber. The call control B synchronizes the performed setting with the mobility/profile databases Ca, Cn that are assigned to the other SIM cards or end devices B20, B30.

POSSIBILITIES OF APPLICATION OF THE METHOD ACCORDING TO THIS INVENTION AND TIPS ON ITS EXECUTION a) Using an end device and its common functions, the subscriber to a public cellular phone network can normally activate the features of his public network assigned to the end device (or rather to its identification chip—such as GSM-SIM, UTS-USIM—that is connected to such end devices) in such a manner that this change has a synchronous effect also on other features stored in the same network and assigned to other devices (or rather to identification chips connected to them) of the same subscriber. This occurs in that an intelligent call control polls the profile of the particular end device and applies it, for example, to one or more associated end devices to control their features during a call setup.

b) The network resources (switching, lines) required to switch one or more parallel calls to one or more end devices of a user are minimized in that, before the call is delivered with the resulting necessary occupancy of the required resources, polling the corresponding mobility/profile databases and also the switching facilities, in which the end devices are located, first an intelligent call control derives the system status (for example, busy, free, not reachable) of the end devices to be called and derives from it the optimal call delivery, during which only call attempts that promise success are initiated.

c) The network resources (switching, lines) required for the switching of a call forwarding in the public cellular phone network are minimized in that, before the call is delivered, polling the corresponding database that stores the assigned feature profile and also the switching facilities, in which the end device is located, first an intelligent call control derives the system status (for example, busy, free, not reachable) of the end device to be called and—if possible—immediately initiates a call forwarding process in accordance with the determined system status of the end device (free, busy, not reachable) and the settings of the end device, i.e., without setting up a line to the end device called. If it is possible to derive from the determined system status that an end device is free to receive a call, first the call is delivered, however, in such a manner that—should it not be accepted (for example, because the end device is technically not reachable, the subscriber does not respond, the subscriber rejects the call), the occupied line is again released up to the origin of the connection and, depending on the end device status determined from the unsuccessful call attempt and the previously determined settings of the end device for call forwarding functionality, a direct connection is established to a desired call forwarding target.

d) Use and combination of the above methods to optimize the network resources used and the customer-relevant system behaviour for the execution of parallel call attempts of end devices assigned to a user initiated by a call. Here, based on the evaluation of the system statuses of all parallel end devices being called, the call forwarding is initiated in the original switching facility by a central control.

The invention claimed is:

1. A method to control a configuration containing an array of two or more telecommunication end devices (multiple-device configuration) in a public telecommunication network, characterized in that upon the activation by a subscriber of changes in the features of the public telecommunications network assigned to a first end device or to an identification chip connected to the first end device, these changes in the features are automatically activated, at the same time or with a temporal delay, also in the other end devices or in the identification chips connected to the other end devices of the multiple-device configuration, wherein an intelligent call control polls a mobility/profile database for the profile of the first end device or of an identification chip connected to the first end device and, at least partially, uses the profile to control the features during the call setup to at least one more end device; and including, before a call is delivered, polling the corresponding mobility/profile databases and switching facilities in which the end devices are located, the intelligent call control determining system status of an end device to be called, and immediately initiating a call forwarding process in accordance with the determined system status of the end device to be called and the activated feature of the end device to be called without setting up a line to the end device to be called; wherein if the determined system status of the end device to be called is free to receive a call, first the call is delivered in such a manner that should the call not be accepted, a corresponding line is released up to an origin of connection and, depending on the status of the end device to be called determined from the unsuccessful call attempt and previously determined settings of the end device to be called for call forwarding functionality, a direct connection is established to a desired call forwarding target.

2. The method of claim 1, wherein the intelligent call control not only uses profile data of the mobility/profile database of the first end device for the control, but said profile data is also synchronized with mobility/profile databases of identification chips of the other end devices.

3. The method of claim 2, wherein the subscriber using any of the subscriber's end devices can poll the status of assigned mobility/profile databases of all the subscriber's end devices and receive the same information about the status of the features of the other end devices.

4. The method of claim 1, wherein when the subscriber changes a setting on the first end device, such change is communicated by the first end device, or by the identification chip connected to the first end device, through a switching facility and the mobility/profile database of the first end device and stored in the first device mobility/profile database; the mobility/profile database for the first end device informs the intelligent call control about the setting performed by the subscriber and the intelligent call control synchronizes the performed setting with mobility/profile databases that are assigned to the other end devices or the identification chips connected thereto.

5. The method of claim 1, wherein during a call setup the intelligent call control polls the profile of the first end device and applies the profile to one or more other end devices.

6. The method of claim 1, including, before a call is delivered, polling the corresponding mobility/profile databases and switching facilities in which the end devices are located, the intelligent call control determining system status of an end device to be called and deriving from the system status an optimal call delivery during which only call attempts that promise success are initiated.

7. The method of claim 6, wherein the system status includes one of busy, free and not reachable.

8. The method of claim 1, wherein the system status includes one of busy, free and not reachable.

9. The method of claim 1, wherein the call forwarding is initiated in the switching facilities by a central control.

* * * * *